Dec. 7, 1937. C. OLDER Re. 20,575

EXPANSION JOINT FOR PAVEMENTS AND THE LIKE

Original Filed Aug. 8, 1931 3 Sheets-Sheet 1

Inventor:
Clifford Older
By Williams, Bradbury, McCaleb & Hinkle, Attys

Dec. 7, 1937. C. OLDER Re. 20,575

EXPANSION JOINT FOR PAVEMENTS AND THE LIKE

Original Filed Aug. 8, 1931 3 Sheets-Sheet 2

Inventor:
Clifford Older
By Williams, Bradbury, McCaleb & Hinkle,
Attys.

Dec. 7, 1937. C. OLDER Re. 20,575

EXPANSION JOINT FOR PAVEMENTS AND THE LIKE

Original Filed Aug. 8, 1931 3 Sheets-Sheet 3

Inventor:
Clifford Older
By Williams, Bradbury, McCaleb & Hinkle,
Attys.

Reissued Dec. 7, 1937

Re. 20,575

UNITED STATES PATENT OFFICE 20,575

EXPANSION JOINT FOR PAVEMENTS AND THE LIKE

Clifford Older, Wilmette, Ill.

Original No. 1,918,554, dated July 18, 1933, Serial No. 555,949, August 8, 1931. Application for reissue June 15, 1935, Serial No. 26,852

19 Claims. (Cl. 94—18)

The present invention relates to expansion joints for pavement and the like and is particularly concerned with expansion joints for concrete roads and the like.

The concrete pavements of the prior art are ordinarily constructed in a plurality of sections with cracks between the sections and with substantially larger expansion cracks located at regular intervals for the purpose of permitting the longitudinal expansion of the pavement under changes of temperature of the pavement. Expansion joints of this type may be installed to permit initial expansion or contraction, depending upon the result desired.

When the separate sections of the pavement expand, there is a gradual sliding of the sections toward the expansion crack or joint, but when the sections subsequently contract, they do not tend to return to their former position. This results in the disappearance of the relatively wide expansion crack, and the space utilized by the wide expansion crack is soon divided into a plurality of cracks formed between adjacent sections of the pavement, and it is practically impossible to prevent this action of the pavement sections in closing up the expansion joints.

The open expansion joints and cracks between adjacent sections soon become filled with dust, soil and sand particles, and as this material is generally incompressible it follows that when expansion again takes place, the joints cannot close between the adjacent sections and the whole series of sections is pushed still further toward the expansion joint, until eventually all of the joints, including the expansion joint, have become filled with hard packed unyielding material. The purpose of the expansion joint is then defeated and further expansion of the concrete sets up compression stresses as great as there would be in case no expansion joint had been provided in the first place.

Another difficulty encountered in providing expansion joints lies in the fact that the continuous expansion and contraction of the concrete permits the sand, soil and other material to get in between the sections of concrete and the folds of the expansible metal joint. As the space between the concrete sections around the expansible metal becomes filled with hard packed material, the expansible fold itself becomes compressed between the sections of concrete and hard packed material in the crack with the result that the easy curve, preferably provided between the folds of the expansible joint, becomes pressed to a sharp edge, thereby causing the expansible metal strip to crack along the sharp edge between the sections of concrete. Unless provision is made for taking care of this tendency the fold in the expansible metal strip ultimately takes the form of a sharp bend, the metal then becomes pinched or creased and cracked and the purpose of the expansible joint is defeated.

One of the objects of the present invention is the elimination of the foregoing difficulties by the provision of an improved expansion joint of relatively simple and economical construction which is adapted to permit relative movement between adjacent sections of the pavement and to prevent the filling of the cracks between the sections with dirt or other foreign material.

Another object of the invention is the provision of a plurality of improved and simplified forms of expansion joints adapted to positively prevent the formation of a sharp bend, fold or crease, and to prevent the pinching of the sheet metal of the joint by the foreign material filling the crack, so that the expansible metal joint will not be cracked or broken after a long period of service.

Another object of the invention is the provision of a plurality of forms of metal expansion joints for pavement, or the like, which are not only adapted to secure the adjacent movable sections of concrete together, but are also adapted to act as a division plate for producing a crack at a predetermined point in the pavement.

Another object of the invention is the provision of a plurality of improved forms of expansion strips, the folds of which are provided with cylindrical portions having a filling which positively precludes the folds from being forced into a sharp bend or crease, thereby preventing the cracking of the strips at this point.

Another object of the invention is the provision of an expansion strip adapted to be used with my improved division plates or with any of the modern parting plates.

Another object of the invention is the provision of an expansion strip and parting plate assembly peculiarly adapted to take care of initial expansion without any possibility of the main fold of the expansion strip being squeezed into a crack by the adjacent sections of concrete.

Other objects and advantages of the invention will be apparent from the following description and from the accompanying drawings, in which similar characters of reference indicate similar parts throughout the several views.

Referring to the drawings, of which there are three sheets,

Figure 1:
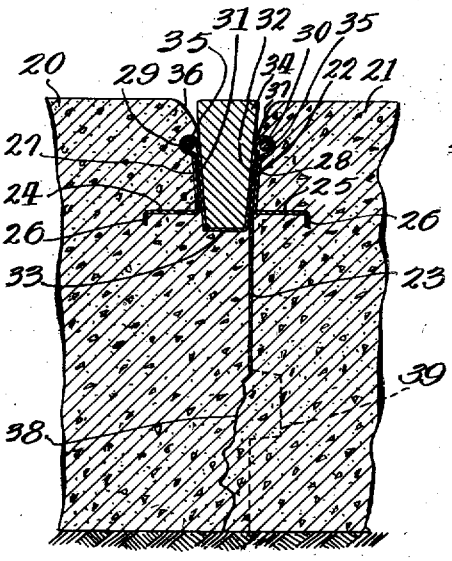
Fig. 1 is a fragmentary sectional view of a pavement showing one form of expansion joint with a simple parting strip.

Referring to Fig. 1, the concrete sections 20, 21 are shown in connection with an expansion strip indicated in its entirety by the numeral 22 and a parting strip 23. The expansion strip 22 may be used with or without parting strips and it is adapted to be used with any of a multiplicity of different types of parting strips, some of the most important of which are illustrated.

The expansion strip 22 is preferably formed with a pair of inwardly extending flanges 24, 25, having downwardly or upwardly bent ends 26 forming anchoring formations secured in the concrete sections 20, 21. The flanges 24 and 25 are joined to upwardly extending flanges 27, 28 which terminates in substantially cylindrical beads 29, 30.

The beads 29 and 30 constitute auxiliary folds in the expansion strip 22 but the main fold of the expansion strip is provided by the downwardly extending flanges 31, 32 which are joined by the central portion 33 of the strip and the central portion 33 extends preferably below the wings 24, 25 to prevent the pinching of this fold by the adjacent parts of the sections of concrete 20 and 21. The flanges 31 and 32 of Fig. 1 diverge slightly to form a wedge shaped opening capable of receiving a removable steel bar 34, or a semi-plastic bitumen filler which may be left in place, if desired.

The circular folds 29 and 30 are preferably filled with metal wires 35 so as to positively preclude these folds from being compressed into a sharp crease which would result in the cracking of the fold and these folds are preferably anchored in the concrete as shown in Fig. 1. It will be noted that the concrete has been rounded off at 36 on each section 20, 21 and the flanges 31 and 32 may serve as guides in the edging operation or the metal bar 34 may be used as a guide. It will be noted, however, that the concrete extends downward at the point 37 inside of each of the beads 29, 30 and, under ordinary conditions, the beads 29, 30 should remain anchored in the concrete and the principal bending should take place at the lower portion 33 of the strip 22.

Under some conditions however, the beads 29 and 30 may be pulled out of the adjacent sections of concrete but, in any event, it will be practically impossible for the dirt, sand and other compressible material which gathers about the joint to compress these beads into a sharp crease. One of the principal defects of the expansion strips of the prior art was the inability of such strips to prevent this creasing or cracking action.

The parting strip 23 may consist of a plane metal strip which is resiliently clamped between the flanges 28 and 32 or flanges 27 and 31, and adapted to insure the location of the crack 38 at the expansion joint. If desired, the parting strip 23 may be formed with a laterally extending trough 39 for shaping the joint between the sections in such manner that the sections will be maintained in alignment with each other.

The main fold 33 of the expansion strip 22 preferably extends lower than the flanges 24, 25 so that this fold would not be pinched by the adjacent flanges 31 and 32.

Figure 2:
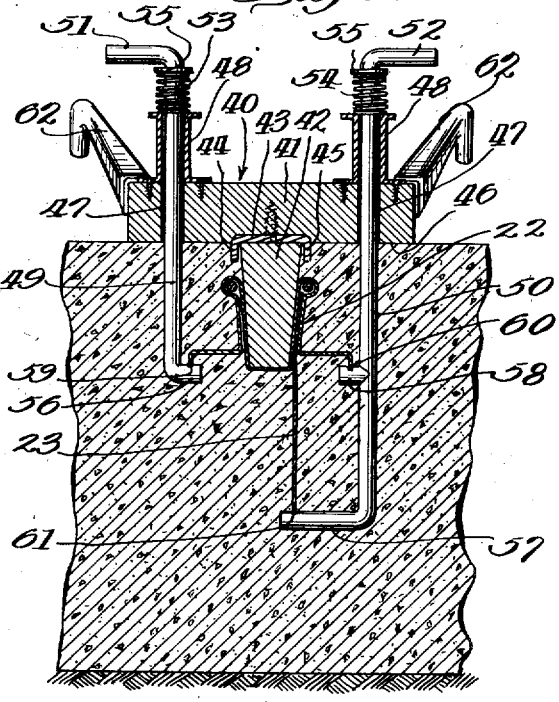
Fig. 2 is a view similar to Fig. 1, showing the construction of the template for installing the parting strip and showing the strip during its installation but before the removal of the template.

Referring to Fig. 2, this is a similar view of the expansion strip during the course of its installation in the green concrete. The expansion strip is supported upon a template which may be indicated in its entirety by the numeral 40 and which consists preferably of a flexible body 41 of metal or lumber which may be provided with a metal bar 42 fixedly secured to its lower side for telescopically engaging the flanges 31, 32 or with a channelled metal member 43 having flanges 44, 45 for engaging the sides of the tapered bar 42 when a loose bar or filler is used.

The body 41 of the template 40 is sufficiently flexible to conform to the actual crown of the concrete rather than the theoretical curve desired and the lower flat surface 46 of the template acts as a gauge surface for locating the expansion strip 22 at a predetermined depth below the surface of the concrete when the surface 45 engages the top of the concrete. The template body 41 is provided with bores 47 and with metal guides 48 for slidably receiving the rods 49 and 50.

Each rod is preferably provided with a laterally bent upper end 51, 52 forming a handle and the rods are urged upward by helical compression springs 53, 54 which are compressed between the upper ends of the guides 48 and the washers 55. The lower end of the rods or plungers 49, 50 are provided with a plurality of laterally extending portions 56, 57, 58 adapted to engage parts of the expansion strips 22 to hold it against the template. The groove 59 in the end 56 engages the anchoring formation 46 on flange 24. Groove 60 in laterally extending portion 48 engages the other anchoring portion 56 of flange 25. Groove 61 on the laterally bent end 57 engages the lower edge of the parting plate 23. The expansion strip assembly is secured to the template by locating it in a position shown in Fig. 2 with respect to template 40 and then pushing the plungers 49 and 50 downward beyond the flanges and parting plate 23 and rotating the plungers 49 and 50 until the grooves engage the extending edges of the expansion strip and parting plate. The template preferably has prepared handles 62 at each end or it may be supported from a stirrup by cables leading to its half and quarter points.

The expansion joints described herein which merely consist of an upper unit and a parting strip may be installed by the use of such a template by forcing the parting strip and the expansion strip down into the wet and green concrete just after the surface of the concrete has been finished. The engagement between the lower flat surface 46 on the template and the upper flat surface of the concrete determines the final position of the parting plate and expansion strip. The plungers 49 and 50 are thus pushed downward and rotated to release the parting plate and expansion strip and the template is removed.

In some cases, the bar 42 is removed with the template but in other cases it may be left and used as a guide in finishing the adjacent edges 36. The holes left by the plungers are, of course, filled up by smoothing the adjacent surface with a trowel or other tool.

Figure 3:
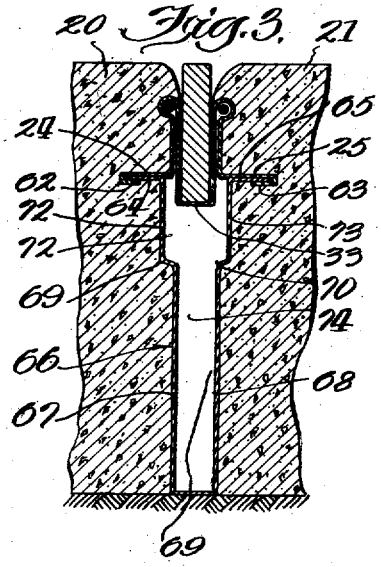
Fig. 3 is a similar view of a modification.

Referring to Fig. 3, this is a modified form of construction in which the flanges 24 and 25 are provided with backwardly bent portions 62 and 63 spaced sufficiently from the flanges 24 and 25 to receive the flanges 64 and 65. The expansion joint of Fig. 3 is adapted to permit initial expansion of the concrete sections and is, therefore, provided with a special parting plate which may be indicated in its entirety by the numeral 66. The parting plate 66 comprises two parallel flanges 67 and 68 joined by a yoke 69 which may be located at the lower surface of the concrete.

The parallel flanges 67, 68 are provided with outwardly extending offset portions 69, 70 forming an enlarged space 71 between the flanges 72, 73. The flanges 72, 73 support the laterally extending flanges 64 and 65 which are adapted to be received in between flanges 24, 62 and 25, 63. The parting plate unit 66 may thus be sprung together until its feet 64, 65 are engaged in the grooves formed by flanges 24, 62 and 25, 63. This expansion joint assembly provides a space 74 between the adjacent sections 20, 21 of concrete so that the concrete may expand to fill the space 74. The enlarged space 71 is adapted to prevent the adjacent flanges 72, 73 engaging the main fold 33 of the expansion strip when such initial expansion takes place. The adjacent ends of the concrete sections cannot, therefore, force the fold 33 into a sharp crease, and the cracking of this fold is thus prevented.

Figure 4:
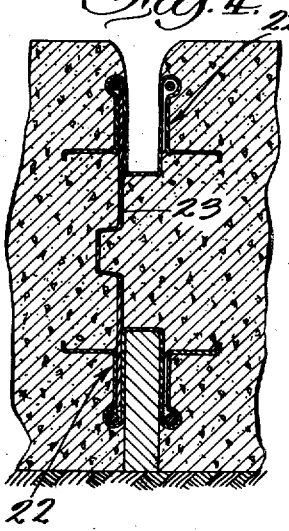
Fig. 4 is a similar view of another modification, both the top and bottom of the crack being protected.

Referring to Fig. 4 this is another modification in which the same type of expansion strip 22 is utilized at the top and bottom of the concrete. In this embodiment, a division plate 23 is resiliently engaged by the flanges 27 and 31 of each expansion strip 22, and it will thus be apparent that the present expansion strip is adapted to be used with parting strips in a number of different ways.

Figure 5:
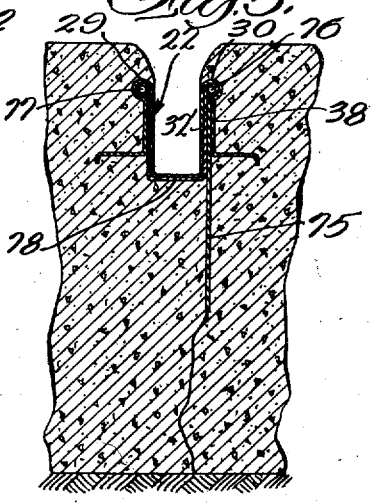
Fig. 5 is a similar view of another modification with a different form of parting strip.

Referring to Fig. 5, this is another modified expansion joint in which the parting plate 75 consists of a plane strip of sheet metal which is resiliently clamped between the flanges 32 and 28 of expansion strip 22. The filling for the cylindrical beads 29 and 30 is provided by the wires 76, 77, but in order to insure the maintenance of these wires in proper position the wires 76 and 77 are supported by a yoke 78 comprising a U-shaped trough of sheet metal, having its upper edges curled about the wires 76, 77.

The lower part of the yoke 78 engages the concrete below it, which positively prevents the dropping of this yoke when the flanges 27, 31 and 28, 32 are separated under abnormal conditions.

Figure 6:
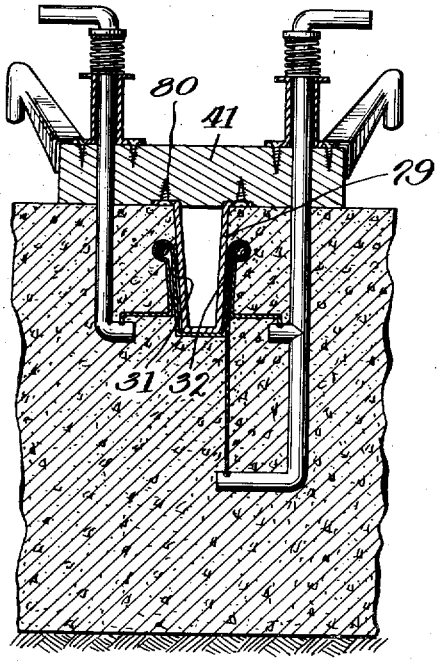
Fig. 6 is a fragmentary sectional view of a concrete pavement immediately after the placing of one of the expansion strips and the parting strip by means of a special template.

Referring to Fig. 6, this is a similar view showing a modified form of template in which the template body 41 is provided with a sheet metal member 79 of a shape complementary to the inside of the expansion strip 22. The sheet metal member 79 is fixedly secured to the template body 41 by the screws 80, and it telescopically engages between the flanges 31 and 32.

Figure 7:
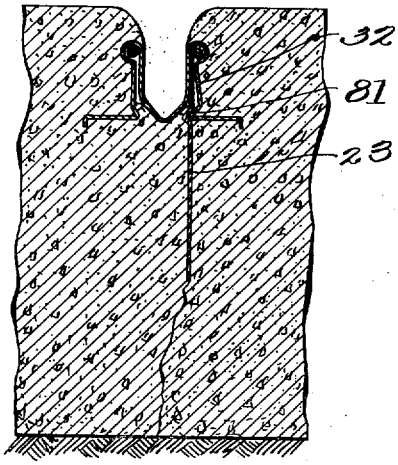
Fig. 7 is a fragmentary sectional view of another modified form of expansion joint.

Referring to Fig. 7, this is another modification in which the flange 32 is provided with a rib 81 for the purpose of more firmly engaging the parting plate 23. If desired, the parting plate 23 may be formed with a complementary grooved or stamped formation for receiving the rib 81.

Figure 8:
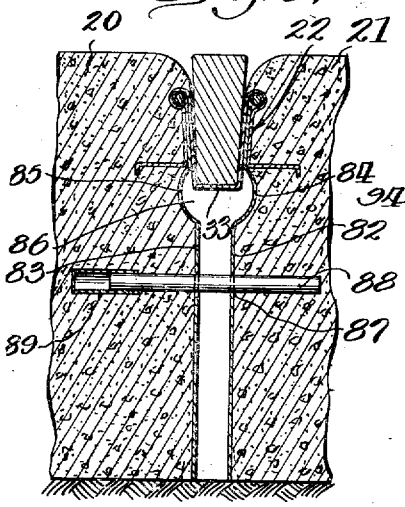
Fig. 8 is a similar view of a modified form of expansion joint peculiarly adapted to permit initial expansion of the concrete.

Referring to Fig. 8, this modification of the same type of expansion strip 22 may be used with a pair of separate division plates 82, 83. Division plates 82, 83 are preferably formed with troughs or depressions 84, 85 adjacent the main fold 33, and the division plates 82, 83 are supported in spaced relation and parallel to each other by the respective flanges 28, 32 and 27, 31. The enlarged space 86 adjacent the main fold 33 positively prevents the division plates 82, 83 from engaging and pinching the main fold 33. The division plates 82, 83 are provided with apertures 87 for receiving dowel pins 88 which may be provided with metal caps 89 located in one of the concrete sections 20, 21 so as to make provision for the telescopic engagement of the dowel pins 88 in one of the sections of concrete.

This expansion joint provides for the initial expansion of the sections of concrete and permits expansion and contraction of the joint for long periods of time without any possibility of the folds being bent into sharp creases or cracks.

Figure 9:
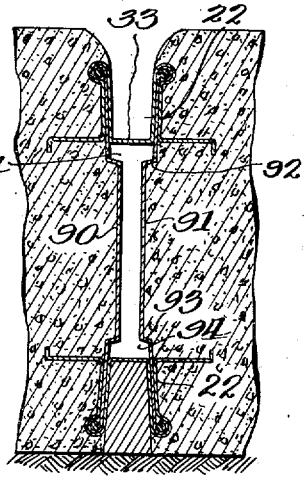
Fig. 9 shows a similar view of another modification.

Referring to Fig. 9, this is another modification, in which expansion strips 22 are used at the top and bottom of the concrete. The parting plates 90, 91 are provided with offsets at 92, 93, forming enlarged spaces at 94 adjacent the main folds 33. The extent of expansion permitted is equal to the space between the main portions of the division plates 90, 91, which may cause the fold 33 to bulge downward, but the fold 33 can never be pinched between adjacent sections of concrete.

Figure 10:
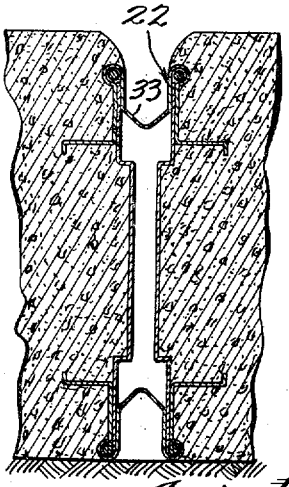
Fig. 10 is a similar view of another modification.

Fig. 10 is another modification, in which the same type of division plates may be utilized, but the shape of the main fold 33 of the expansion strip 22 has been made of substantially V-shape instead of U-shape as previously described.

Figure 11:
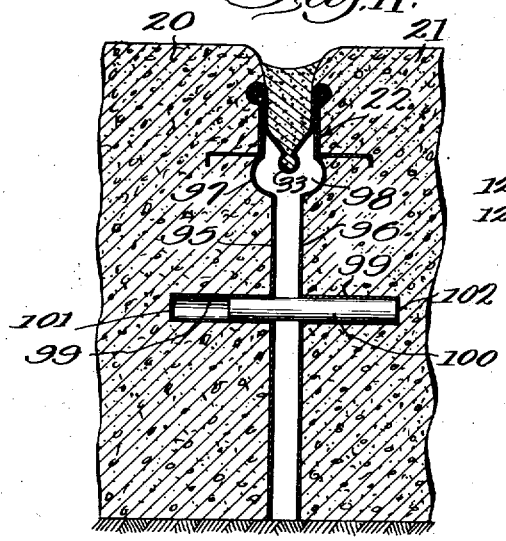
Fig. 11 is a fragmentary sectional view of another modification, having a dowel plate to maintain the alignment of the pavement sections.

Referring to Fig. 11, this is another modification in which the main fold 33 of the expansion strip 22 takes the form of a substantially cylindrical bead. The division plates 95, 96 are provided with curved grooves 97 forming an enlarged space 98 adjacent the main fold 33. The division plates 95, 96 are formed with longitudinally extending grooves 99 for receiving a dowel plate 100. The dowel plate 100 is of less width than the space between the ends 101, 102 of the grooves 99 so as to leave space for the initial expansion of the concrete sections 20, 21, and the dowel plate 100 is adapted to maintain the sections 20, 21 in substantial alignment.

Figure 12:
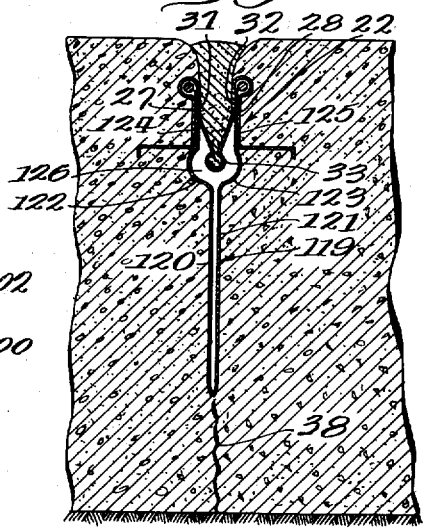
Fig. 12 is a similar view of another modification.

Referring to Fig. 12, this is an expansion joint having a similar expansion strip 22, but the parting plate 119 comprises a pair of parallel flanges 120, 121 bent back against each other and having the outwardly bent portions 122, 123 to bring the upper flanges 124, 125 into position to be engaged between flanges 27, 31 and flanges 28, 32. The offset portions 122, 123 form an enlarged space 126 around the main fold 33. The main body of the parting strip 119 need not be as wide as the depth of the concrete, since the crack 38 will result from the weakening of the concrete at this point.

Figure 13:
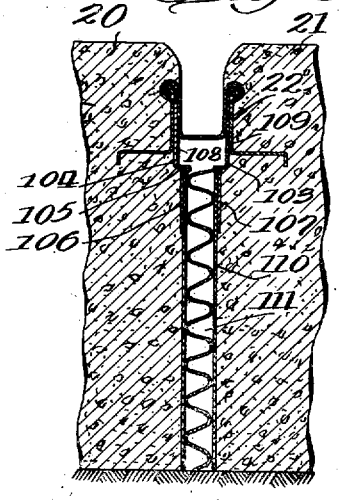
Fig. 13 is a similar view of another modification in which a cellular paper filler is used to provide a space for the initial expansion of the concrete sections.

Fig. 13 is another modified form of expansion joint in which the same expansion strip 22 is used with a pair of guide plates 103, 104. Guide plates 103, 104 are provided with offset portions 105 bringing the flanges 106, 107 into closer proximity to the flanges 108, 109. The flanges 106, 107 may resiliently engage a cellular or corrugated cardboard spacing member 110, which is adapted to prevent the space 111 between the sections 20, 21 from being filled with concrete, but which can be crushed by the concrete as it expands.

Figure 14:
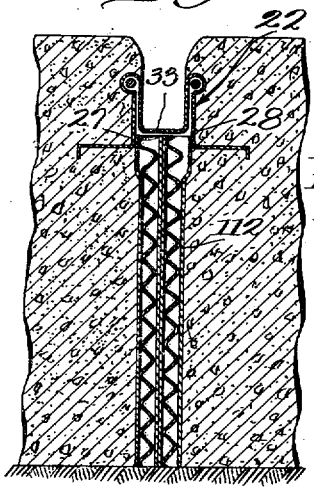
Fig. 14 is a similar view of another modification of the same type.

Fig. 14 is another modified assembly in which the guide members 103, 104 have been omitted and the cellular filler 112 is engaged directly by the flanges 27 and 28.

Figure 15:
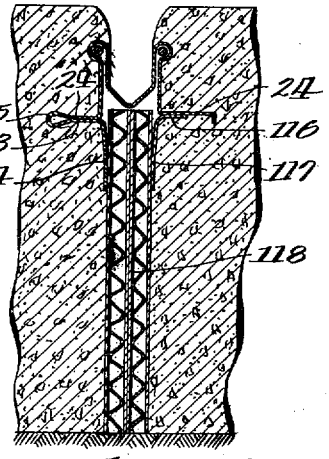
Fig. 15 is a similar view of another modification.

In the modification of Fig. 15, the expansion strip 22 is provided with backwardly bent flange and a downwardly extending guide flange 114. The flanges 24 and 113 are joined by an enlarged bead 115 which provides an anchoring formation. Another mode of construction is shown at the right side where the angle iron guide member 116 is spot welded to the flange 25 and provided with a downwardly extending guide flange 117 for supporting the cellular filler 118.

It will thus be observed that I have invented a plurality of improved forms of expansion strips, parting strips and expansion joint assemblies, in which provision has been made for initial expansion, initial contraction or both. The present expansion strips are peculiarly adapted to eliminate the tendency of the strips of the prior art to cause sharp folds or creases between the flanges of the expansion strips after the adjacent spaces have been filled with dirt, sand or other sharp, solid and incompressible material.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In an expansion joint, the combination of a pair of sections of concrete with an expansion strip having anchoring portions embedded in each of said concrete sections, a pair of substantially parallel flanges joined together to form a main expansible fold, and a pair of substantially cylindrical beads joining said parallel flanges with said anchoring portions.

2. In an expansion joint, the combination of a pair of sections of concrete with an expansion strip having anchoring portions embedded in each of said concrete sections, a pair of substantially parallel flanges joined together to form a main expansible fold, and a pair of substantially cylindrical beads joining said parallel flanges with said anchoring portions, said beads being provided with relatively incompressible filler to prevent forming a sharp crease at said beads.

3. In an expansion joint, the combination of an expansion strip having a main fold with a pair of substantially parallel flanges, an auxiliary flange engaging each of said parallel flanges, anchoring flanges carried by said auxiliary flanges, a parting strip clamped between one of said parallel flanges and said auxiliary flanges, and substantially cylindrical formations joining each of said auxiliary flanges to one of said parallel flanges.

4. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion strip, and a division plate having a bead at one edge, said division plate having its bead located in one of the first-mentioned cylindrical beads, and being clamped between one of said downwardly extending flanges.

5. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, and a pair of downwardly extending flanges joined together to form a main expansible portion of said expansion strip, said cylindrical beads being embedded in said concrete sections.

6. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion strip, and a pair of separate parting plates, each parting plate being resiliently clamped between an upwardly and a downwardly extending flange of said expansion strip.

7. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion strip, and a pair of separate parting plates, each parting plate being resiliently clamped between an upwardly and a downwardly extending flange of said expansion strip, said parting plates being formed with offset portions to provide an enlarged space around said main expansible portion.

8. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion strip, and a cellular spacer located beneath said main expansible portion for spacing said concrete sections from each other, said cellular spacer being adapted to be crushed by the expansion of the concrete sections.

9. An expansion joint comprising a pair of adjacent sections of concrete, an expansion strip having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion strip, a cellular spacer located beneath said main expansible portion for spacing said concrete sections from each other, said cellular spacer being adapted to be crushed by the expansion of the concrete sections, and a pair of guide plates carried by said expansion strip and adapted to engage said cellular spacer.

10. In a concrete road joint the combination of a pair of adjacent sections of concrete with an expansion member having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion member, and a pair of spaced parting plates having their upper edges secured to said expansible member to form an air space between the sections of concrete.

11. In a concrete road joint the combination of a pair of adjacent sections of concrete with an expansion member having an anchoring flange extending into each section of concrete, an upwardly extending flange carried by each of said anchoring flanges, a substantially cylindrical bead carried by each of said upwardly extending flanges, a pair of downwardly extending flanges joined together to form a main expansible portion of said expansion member, and a pair of spaced parting plates having their upper edges secured to said expansible member to form an air space between the sections of concrete, said parting plates being formed with offset portions to provide an enlarged space around said main expansible portion.

12. In a concrete joint forming member, the combination of a pair of sections of concrete with a flexible metallic seal for closing the space between the sections, said seal having a pair of laterally projecting anchoring flanges, one of which is anchored in each concrete section, and having upwardly extending flanges located adjacent the edges of the concrete sections, beads formed at the edges of said upwardly extending flanges, and a pair of downwardly extending flanges integrally joined together, extending from said beads and forming a medial expansible portion, and a filling of semi-plastic material arranged over said medial expansible portion.

13. In a concrete joint forming member, the combination of a pair of sections of concrete with a flexible metallic seal for closing the space between the sections, said seal having a pair of laterally projecting anchoring flanges, one of which is anchored in each concrete section, and having upwardly extending flanges located adjacent the edges of the concrete sections, beads formed at the edges of said upwardly extending flanges, a pair of downwardly extending flanges integrally joined together, extending from said beads and forming a medial expansible portion, a filling of semiplastic material arranged over said medial expansible portion, and an air space forming core comprising a pair of upwardly extending sheet metal walls joined together at the bottom and located at the top between the upwardly extending flanges and the downwardly extending flanges of said flexible seal.

14. In a concrete joint forming member, the combination of a pair of sections of concrete with a flexible metallic seal for closing the space between the sections, said seal having a pair of laterally projecting anchoring flanges, one of which is anchored in each concrete section, and having upwardly extending flanges located adjacent the edges of the concrete sections, beads formed at the edges of said upwardly extending flanges, a pair of downwardly extending flanges integrally joined together, extending from said beads and forming a medial expansible portion, a filling of semipastic material arranged over said medial expansible portion, an air space forming core comprising a pair of upwardly extending sheet metal walls joined together at the bottom and located at the top between the upwardly extending flanges and the downwardly extending flanges of said flexible seal, and means located at the upper ends of said walls in said beads for filling said beads to prevent the crushing of the beads.

15. In a concrete joint forming mechanism, the combination of a pair of concrete sections formed with a crack between them, with a flexible sealing member, said flexible sealing member having an intermediate expansible portion and having laterally projecting anchoring flanges embedded in the concrete sections and a reserve expansible portion formed between one of said anchoring flanges and said intermediate expansible portion, said reserve expansible portion being anchored in a concrete section and adapted to be drawn out of the concrete section when the concrete expands sufficiently to require the reserve expansible portion of said seal.

16. In a concrete joint forming mechanism, the combination of a pair of concrete sections formed with a crack between them, with a flexible sealing member, said flexible sealing member having an intermediate expansible portion and having laterally projecting anchoring flanges embedded in the concrete sections and a reserve expansible portion formed between one of said anchoring flanges and said intermediate expansible portion, said reserve expansible portion being anchored in a concrete section and adapted to be drawn out of the concrete section when the concrete expands sufficiently to require the reserve expansible portion of said seal, said reserve expansible portion comprising a pair of substantially parallel walls formed with a bead at their adjoining edges, and the bead being anchored in a concrete section.

17. In a concrete road joint forming member, the combination of an expansion strip having a medial flexible expansible portion terminating in beads at its upper edges, one of said beads being filled with a wire filler, downwardly extending flanges carried by said beads and having anchoring wings anchored in the adjacent sections of concrete, and a parting strip having a wire filled bead at its upper edge, the bead of said parting strip being secured in the bead of said expansion strip.

18. In a concrete joint forming member the combination of an expansion strip having a medial flexible expansible portion terminating in beads at its upper edges, one of said beads being filled with a wire filler, downwardly extending flanges carried by said beads and having anchoring wings anchored in the adjacent sections of concrete, and a parting strip having a wire filled bead at its upper edge, the bead of said parting strip being secured in the bead of said expansion strip, said downwardly extending flanges having inwardly extending edges and said parting strip having a complementary ridge for engagement and securement of said parting strip to said expansion strip.

19. In a concrete joint forming device, the combination of a flexible seal formed with a pair of anchoring flanges adapted to be anchored in two adjacent concrete sections, a pair of upwardly extending walls extending one from each of said anchoring flanges and metallic beads formed at the upper edges of said walls and joined to depending walls which are joined together to form a medial expansible portion, a parting strip arranged between two of said walls and supported thereby in position to form a crack between adjacent concrete sections, said parting strip having means formed therein for engaging a part of said flexible seal to assure its retention between said walls.

CLIFFORD OLDER.